Aug. 23, 1966   A. W. VINCENT   3,268,802
METHOD AND APPARATUS FOR COMPARING THE OPERATING
CHARACTERISTICS OF A RELAY TO A STANDARD
RELAY USING BRIDGE TECHNIQUES
Filed Nov. 24, 1961   2 Sheets-Sheet 1

*INVENTOR.*
ANDREW W. VINCENT
BY
*Attorney*

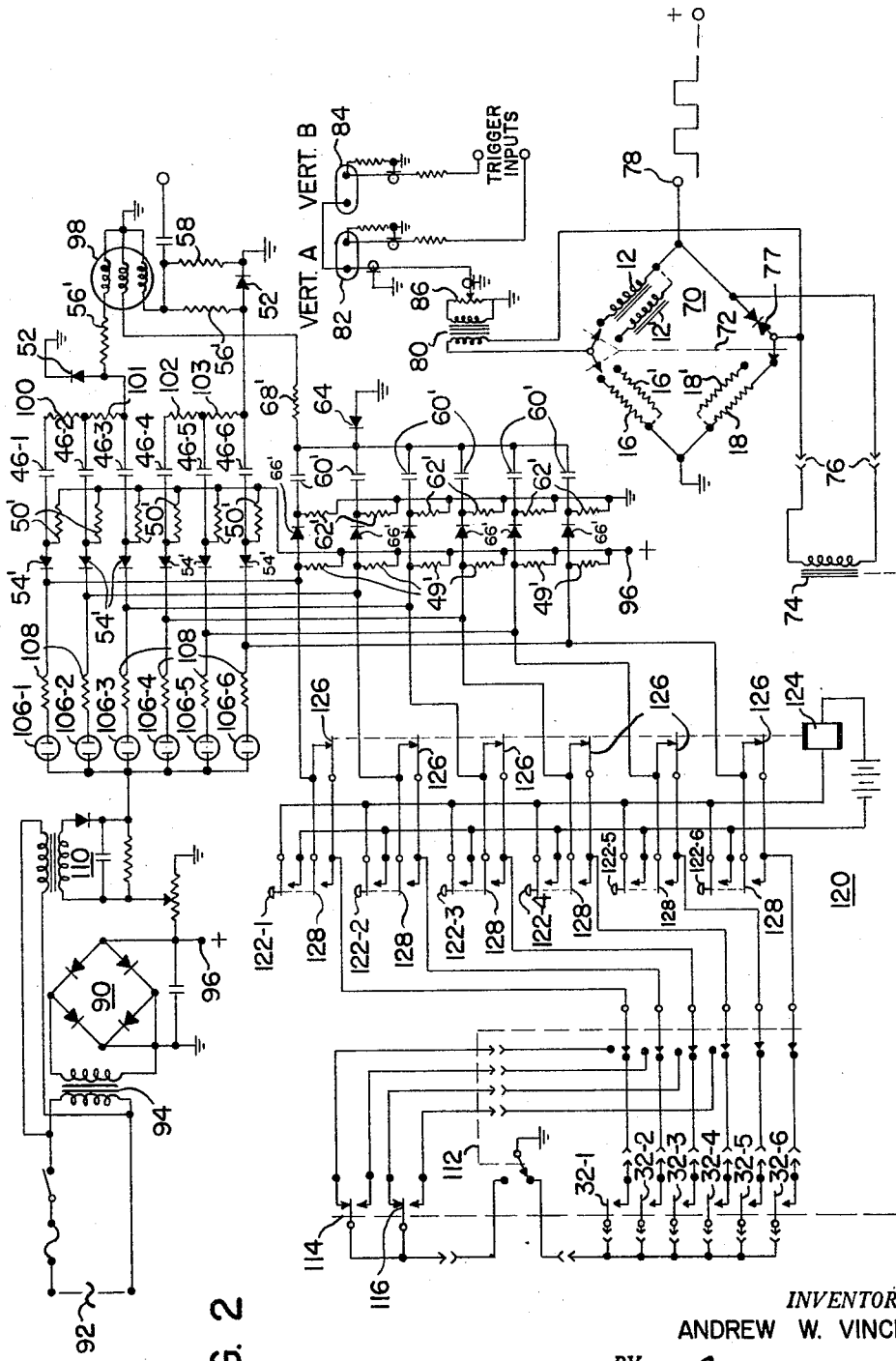

United States Patent Office 3,268,802
Patented August 23, 1966

3,268,802
METHOD AND APPARATUS FOR COMPARING THE OPERATING CHARACTERISTICS OF A RELAY TO A STANDARD RELAY USING BRIDGE TECHNIQUES
Andrew W. Vincent, 65 Aberdeen St., Rochester 19, N.Y.
Filed Nov. 24, 1961, Ser. No. 154,610
6 Claims. (Cl. 324—28)

This invention relates to a novel method of and apparatus for testing electromagnetic relays and crossbar switches, and more particularly, but not necessarily exclusively, to a novel method of and apparatus for testing such relays and switches under typical dynamic operating conditions.

The proper functioning of electromagnetic relays and crossbar switches requires precise adjustment of the motion of the contact system, that is, precise interrelation of the contact closure positions and of the electromagnetic actuator which operates the system. The measurements required to attain the desired adjustments have heretofore usually been made by inserting thickness shims in the magnetic air gap or by use of a dial gage to measure the point of contact closure. In some cases, the time involved to close or open the contacts, after current is applied to or removed from the electromagnetic coil, is important; and it is necessary to measure these time intervals.

The mechanical measurement techniques heretofore employed require a relatively high degree of skill, and even then are of only limited usefulness because they cannot duplicate the dynamic conditions under which the relays normally operate in service. Moreover, they are tedious and time-consuming.

It has also been proposed to mount a transducer on the relay armature to permit measurements to be made under dynamic operating conditions. Although mounting a transducer on the armature represents an improvement over the mechanical measurement techniques, it has not proven fully satisfactory because the transducer increases the mass to be moved by the relay armature, and thus changes the dynamic operating characteristics of the relay.

The primary object of the present invention is to provide an improved method of and apparatus for testing electrical relays and similar electromagnetically actuatable switching devices.

To this end, another object of the invention is to provide a visible, easily interpretable, direct, pictorial presentation of the operating characteristics of electrical relays and switches under typical dynamic operating conditions.

Another object of the invention is to provide improved apparatus for testing relays and switches having means for indicating the time of closure of the relay contacts relative to the time of initiation of energization of the relay coil.

Another object of the invention is to provide improved apparatus of this type including means for indicating the time of opening of the relay contacts relative to the time of opening of the coil energizing circuit.

Another object of the invention is to provide novel apparatus of this type for testing multi-contact relays and crossbar switches including means for identifying the closing and opening times of each of the contacts of a relay.

A still further object of the invention is to provide apparatus for displaying such mechanical positioning and timing information in such way as to make possible rapid and accurate switch adjustment under dynamic operating conditions.

Still another object of the invention is to provide apparatus and a method for testing relays and switches wherein the moving system can exhibit its natural time-position relationship without the objectional effect caused by the addition of extra mass to the system.

Still other objects of the invention are to provide a novel method and apparatus of the type described which is of relatively simple and straight-forward design, capable of use by relatively unskilled personnel, and capable of providing a relatively large amount of detailed information about the operation of the relays being tested.

The foregoing and other objects and advantages of the invention will become apparent from the following detailed description of a representative embodiment thereof, when taken in conjunction with the accompanying drawings, and from the recital of the appended claims.

In the drawings:

FIG. 2 is a schematic diagram of a circuit according to the invention and arranged for testing a crossbar switch of the type having an electromagnetic actuator and six normally open and two double throw contacts;

It is well known that the inductive reactance of an electromagnetic relay actuator varies in response to changes in the position of the relay armature.

According to the present invention, changes of inductive reactance, as reflected in changes of current conduction, due to changes in armature position, are detected and displayed in pictorial form on an oscilloscope. In this way, hitherto undetectable characteristics of relay operation are easily seen. Briefly, in the illustrated embodiment of the invention, instead of merely measuring the growth of current following the initial application of an energizing voltage in a relay under test, the relay is connected in a bridge circuit wherein the transient current through it is compared with the transient current through a second, similar relay, which has a fixed armature and therefore a fixed inductance. In this way, the output signal of the bridge represents only the changes brought about by movement of the armature in the relay under test.

The circuit of the present invention also includes means for generating relatively short electrical pulses at the moments when the contacts make and break, and for displaying the pulses so produced simultaneously with the display of the coil current changes and in timed relationship therewith. The precise time of contact closing or opening, the time of completion of the armature travel, bounce, and other aspects of the relay operation are all clearly indicated.

Figure 1:
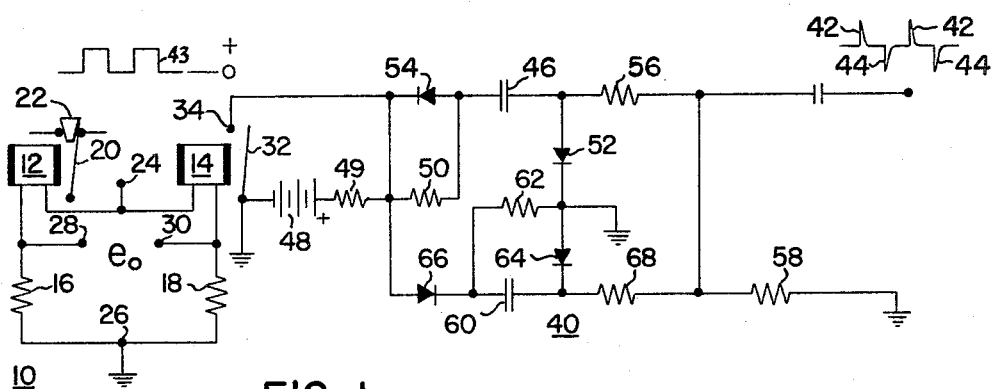
FIG. 1 is a simplified schematic diagram illustrating a relay testing circuit according to one embodiment of the present invention.

The circuit according to the presently preferred embodiment of the invention is shown in simplified form in FIG. 1, and includes a bridge generally designated 10 having a dummy or reference relay 12 and the relay 14, which is under test, connected in adjacent arms on opposite sides thereof. Resistors 16 and 18 of equal values are connected in the other two arms of the bridge. The dummy, or reference, relay 12 is selected to be as nearly identical to the relay 14 under test as reasonably possible, and its armature 20 is mechanically fixed, as by the wedge 22 illustrated, so that the relay coil acts as an ordinary inductive reactance. The bridge is alternately energized and deenergized by any desired means at a rate selected in view of the operating characteristics of the relays 12 and 14. The two relays 12 and 14 are balanced against each other in the bridge 10 so that the output signal $e_o$ of the bridge represents the instantaneous difference between the currents in the two relays 12 and 14. The energizing voltage, which may be in the form of an ON-OFF direct current voltage as shown by the curve 43 is applied across the input terminals 24 and 26, which are, respectively, the point of connection between the two relays 12 and 14 and the point of connection between the resistors 16 and 18. The output signal $e_o$ is taken in the other coordinate direction across the bridge, that is, between the points of connection 28 and 30 between the relays 12 and 14 and the respective resistors 16 and 18.

The output signal $e_o$ of the bridge thus constitutes an indication of the differences between the instantaneous currents carried by the dummy, or reference, relay 12 and the relay 14 under test, and may be applied to the vertical input of an oscilloscope (not shown) to produce a pictorial representation of such differences.

It is also desired to indicate on the same display the relative times that the armature 32 of the relay under test, engages and disengages the fixed contact 34, that is, the precise moments that the circuit controlled by the relay 14, is opened and closed. For this purpose a pulse generating circuit 40 is connected between the armature 32 and the fixed contact 34 for generating relatively short pulses 42 and 44 in response to the engagement and disengagement of the fixed contact 34 by the armature 32. The pulses produced by the pulse generating circuit 40 are applied to the horizontal deflection input of the oscilloscope (not shown) and superimposed on the sweep signal of the oscilloscope to produce laterally extending pips on the oscilloscope trace, which indicate the times of making and breaking the relay contact without affecting the vertical displacement signal.

As shown, the armature 32 is grounded, and the fixed contact 34 is connected to two differentiating circuits, one for producing a pulse upon engagement of the armature 32 with the fixed contact 34, and the other for producing a pulse upon disengagement thereof. The first differentiating circuit includes a capacitor 46 which is charged, during the time the relay 14 is open, by a battery 48, or other direct current source, through a current limiting resistor 49 and a resistor 50 of relatively large value connected directly in series between the battery 48 and the left-hand plate of the capacitor 46. The right-hand plate of the capacitor 46 is connected to ground through a diode or other unidirectional current device 52. Another diode or unidirectional current device 54 is connected between the left-hand plate of the capacitor 46 and the fixed contact 34.

When the armature 32 engages the fixed contact 34, the left-hand plate of the capacitor 46 is connected directly to ground through the unidirectional current device 54, and the capacitor 46 discharges through a differentiating resistor 56 and an output resistor 58, which are connected in series between the right-hand plate of the capacitor 46 and ground. The current flow is from right to left through the differentiating resistor 56, thereby producing a negative pulse 44 relative to ground across the output resistor 58 in response to closing of the relay 14. The first unidirectional current device, or diode 52 permits the charging current of the differentiating capacitor 46 to flow directly through it to ground and to bypass the differentiating resistor 56 when the armature 32 subsequently disengages the fixed contact 34.

The second differentiating capacitor 60 is charged relatively rapidly upon opening of the relay 14 to produce the positive output pulses 42. When the relay 14 opens, the capacitor 60 is charged through the current limiting resistor 49, the diode 66, which is connected in series between the limiting resistor 49 and the left-hand plate of the capacitor 60, and through the differentiating resistor 68 and the load resistor 58. During the time the relay armature 32 is in engagement with the fixed contact 34, the capacitor 60 discharges relatively slowly through a relatively high value resistor 62 and a diode 64, which are connected directly in series across the capacitor 60. The series diode 66 isolates the discharge of the capacitor 60, so that the discharge current has substantially no effect on the output of the circuit at the time of closing of the relay 14.

The differentiating circuit 40 thus produces a series of alternately positive and negative pulses in response to opening and closing of the relay contacts, which pulses may be displayed on the same oscilloscope as the output signal $e_o$ of the bridge circuit 10 to provide a visual indication of the precise times of opening and closing of the relay contacts relative to the times of opening and closing of the relay coil energizing circuit.

FIG. 2 illustrates the practice of the invention as embodied in a circuit for testing so-called crossbar switches, such as illustrated in my Patents Nos. 2,729,706, 2,731,- 516 and 2,950,350, which are a type of relatively high-speed electromechanically actuated switches. As shown, the circuit is arranged for checking the contacts in groups of six or fewer, and includes provision for identifying the particular pulses attributable to opening or closing of each one of the respective contacts. The bridge 70 in this circuit is provided with a selector switch 72, so that different dummy, or reference coils, such as the alternate coils 12 and 12', and corresponding balancing resistors 16 and 16', and 18 and 18', may be selectively switched in and out of the bridge depending upon the characteristics of the armature 74, which it is desired to test. The armature 74 is connected into the bridge 70 by any desired type of jack, or plug 76; and, because of the relatively strong surge voltages that occur upon opening of the coil energizing circuit, a voltage limiting device, such as the oppositely oriented selenium diodes 77, is connected in parallel with the armature 74 under test. The diodes 77 limit the surge voltage developed inductively across the actuators 12 and 74, upon deenergization of the bridge. The output of the bridge 70 is fed through a transformer 80 to the vertical inputs 82 and 84 of a dual trace oscilloscope (not shown). A variable calibrating resistor 86 is preferably included in the circuit between the transformer 80 and the input terminals of the oscilloscope for adjusting the amplitude of the input signal to the vertical amplifier of the oscilloscope.

There are six dual pulse-generating circuits connected with their outputs in parallel across the output resistor 58, which, in operation, is connected across the horizontal deflection input terminals of the oscilloscope. The upper six differentiating capacitors 46–1, 46–2, 46–3, 46–4, 46–5, and 46–6, are connected through the various jacks and switches for producing output pulses of relatively brief duration upon closing of the respective crossbar contacts 32–1 to 32–6, respectively. The lower six differentiating capacitors 60' are connected for producing pulses upon opening of these contacts.

The charging current for the differentiating circuits is supplied by a full wave rectifier 90, which may be of the dry plate type, as shown, and which is arranged to be connected to a conventional power line 92 through a transformer 94. The output voltage of the rectifier 90 appears between its output terminal 96 and ground, and is applied as in the circuit shown in FIG. 1 for charging all of the capacitors 46–1 to 46–6, and 60' in parallel.

The resistors 50' are similar to the resistor 50 shown in FIG. 1, and are of relatively high value for limiting the rate at which the capacitors 46–1 to 46–6 charge during the period the contacts 32–1 to 32–6 are open. A pulse transformer 98 is connected in the output circuit for inverting the pulses, which are produced directly across the output resistor 58 by the discharge of the first three differentiating capacitors 46–1, 46–2, and 46–3 relative to the pulses produced by the second three differentiating capacitors 46–4, 46–5, and 46–6. The pulses produced by the first three capacitors 46–1, 46–2, 46–3, will thus appear to one side, say to the left, of the oscilloscope trace, and the pulses produced by the second three capacitors 46–4, 46–5, 46–6, will appear on the opposite side of the oscilloscope trace. This relative signal inversion assures ready identification between the pulses produced in response to closing of the first three contacts 32–1, 32–2, and 32–3 and those produced in response to closing of the second three contacts 32–4, 32–5, and 32–6 of the six contacts being tested.

In order to provide a readily visible indication to distinguish among the three contacts of each of the two groups, auxiliary resistors 100, 101, 102, and 103 are connected in the differentiating circuit of the first two differentiating capacitors 46–1, 46–2, and 46–4, and 46–5 of each group, respectively. The differentiating circuit of the first capacitor 46–1 includes then not only the common differentiating resistor 56′, but also the two auxiliary resistors 100 and 101, so that the pulse produced upon discharge of the capacitor 46–1 is of relatively small amplitude. The pulse produced by the second capacitor 46–2 is of intermediate amplitude, because the discharge path of this second capacitor 46–2 includes only the single auxiliary resistor 101 in addition to the common resistor 56′. The pulse produced by the third capacitor 46–3 is of relatively large amplitude because its discharge path includes only the resistor 56′. Similarly, with the first two capacitors 46–4 and 46–5 of the second group, the discharge path of the first capacitor 46–4 includes the auxiliary resistors 102 and 103 in addition to the common resistor 56′, so that the pulse output from the capacitor 46–4 is of relatively small amplitude. The discharge path for the second capacitor 46–5 includes the auxiliary resistors 103 in addition to the common resistor 56′, and its output pulses therefore are of intermediate value; while the discharge path of the capacitor 46–6 includes only the common resistor 56′ and so its output pulse is the largest of the three capacitors in the second group.

A series of neon lamps 106–1 through 106–6 are provided for producing a preliminary visible indication of operation of the relays and a check on the operation of the oscilloscope signal. The lamps 106–1 to 106–6 are individually connected through separate respective ballast resistors 108 between the output of a half wave rectifier 110 and respective current limiting resistors 49′. When the contacts 32–1 to 32–6 are open, the output of the full wave rectifier 90 is connected through the resistors 49′ across the lamps 106–1 to 106–6 in opposition to the output of the half wave rectifier 110, and the lamps remain deenergized. The output of the half wave rectifier 110 is selected to be sufficient to energize the lamps when it is connected across them by itself, and to be insufficient to energize them when it is opposed by the output of the full wave rectifier 90. When the respective contacts 32–1 to 32–6 close, the corresponding connecting terminals between the ballast resistors 108 and the limiting resistor 49′ are grounded, so that the output of the full wave rectifier 90 appears across the corresponding current limiting resistors 49′ and no longer opposes the output of the half wave rectifier 110. The lamps 106–1 to 106–6, therefore, are energized individually in response to closing of the different respective ones of the crossbar contacts 32–1 to 32–6 and serve as additional indicators of contact closure.

An additional switching arrangement 112 is illustrated for switching the pulse generating circuits from the normally open contacts 32–1 to 32–6, to two auxiliary, so-called off-normal contacts 114 and 116, which are of the double throw type.

The contacts 32–1 to 32–6 are connected to the pulse generating circuit through a selective switching network 120, which is arranged to disconnect all but a selected one of the contacts from the pulse generating circuit in response to actuation of a selected one of six push buttons 122–1 through 122–6. When any one of the push buttons 122–1 to 122–6 is actuated, it energizes the armature of a relay 124, which has six normally closed contacts 126 connected separately in series between the crossbar contacts 32–1 to 32–6 and the respective pulse-generating circuits. Each one of the push buttons 122–1 to 122–6 is arranged for actuating two contacts, the first one of which (not separately designated) closes the circuit for energizing the relay 124, thereby opening all of the contacts 126. The second contact 128 of each push button bypasses the corresponding one of the normally closed contacts 126, so that when one or more of the push buttons are actuated, the corresponding crossbar contacts 32–1 to 32–6 are connected to their pulse generating circuits through the actuated closed contacts 128, rather than through their corresponding normally closed contacts 126. This feature provides a quick check on the operation of the size and polarity reversal identification feature for the pulses hereinabove described, and also permits ready identification of the so-called "off" pulses, that is, those pulses generated by the charging of the lower six capacitors 60′ in response to opening of the crossbar contacts 32–1 to 32–6. When any one of the push buttons 122–1 to 122–6 is actuated all other contact circuits are opened by the relay 124, so that only a selected one of the pips 138 is seen on the oscilloscope.

The continuous rapid operation of the switch by a separate relay pulsing approximately ten cycles per second achieves a high degree of run-in stabilization during the adjustment procedure. Bearing point burrs are reduced and settling-in adjustment reaches a high degree of final stability during the adjustment period. The use of the electromagnet actuator as a transducer to generate a signal which is displayed on a cathode-ray oscillograph eliminates the need to attach external measuring devices to the moving system. A test fixture used in testing crossbar switches has several dummy actuators with appropriate matching bridge resistance to enable testing of all standard actuator coils which operate on several different voltages. Two such bridge settings, made by a selector switch, are shown in the circuit drawing, FIG. 2.

Figure 3:
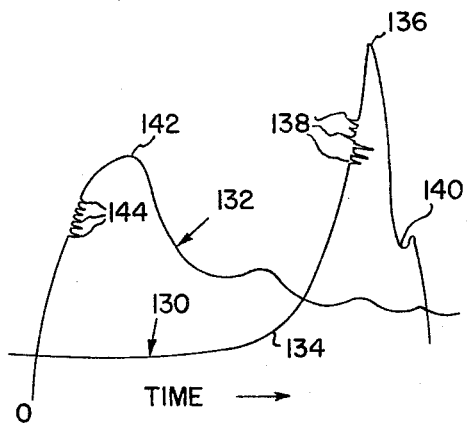
FIG. 3 is a chart showing curves produced on an oscilloscope during operation of the circuit shown in FIG. 2.

Typical curves obtained in operation of the circuit shown in FIG. 2 are illustrated in FIG. 3, which represents the face of a dual trace oscilloscope. The first curve 130 represents the signal generated upon start of the coil current, that is, upon energization of the actuator 74. The second curve 132 is triggered at the time when the coil circuit is opened, and shows the signal produced immediately following deenergization of the actuator, that is, the signal during the release time of contact opening and the release time of the armature.

Looking first at the curve 130 generated in response to energization of the actuator, it will be seen that there is substantially no signal from time zero, that is, from the time the energizing voltage is first applied to the bridge 70 for a few milliseconds up to a point designated 134. This is the period prior to the time the armature first begins to move, and during this period conduction is substantially identical in the two actuators 12 and 74 and there is substantially no voltage across the output terminals of the bridge 70. Vertical displacement of the trace from the point 134 up to the peak 136 of the curve has been found to correspond to actual physical displacement of the armature with a relatively high degree of linearity.

The pips 138 indicate the signals generated by the differentiating circuit in response to the closing of the several contacts and applied to the horizontal input terminals of the oscilloscope. In a properly operating relay, the pips 138 representing actual closing of the contacts occur before the armature has completed its travel. The pips 138 are at opposite sides of the curve and are of different position and amplitude because of the differences between the discharge paths of the different capacitors 46–1 to 46–6.

After the point 136, where the armature has completed its closing travel, the difference between the currents in the dummy, or reference actuator, 12 and the actuator 74 under test, again diminishes to a negligible value. The hook-like portion 140 of the curve represents bounce of the armature, and if the armature bounce is sufficient to open the contacts again, further pips will be displayed at that region of the curve.

The curve 132 is shown in inverted form for convenient display, and, again, vertical displacement up to the peak 142 represents mechanical displacement of the armature from its fully closed position. This curve does not show direct displacement as in the "on" curve 130; however important information can be gained from this curve. Phenomena, such as mechanical vibrations, are easily seen on this curve, which can indicate the desirability of corrective measures if it departs from a known standard. The pips 144 generated in response to opening of the contacts are all to one side of the trace and are all of substantially the same size since a discriminating network is not included in the circuit for producing these pips 144. The wavy, or scalloped portion of the curve to the right of the peak 142 represents vibration of the armature as it stands in its newly released, fully open position.

These two curves 130 and 132 are what the switch adjuster sees and from them he can determine when the armature starts to move (point 134 on curve 130), the displacement and time of contact closures as indicated by the six pips 138, three right and three left on curve 130. Point 136 indicates the time and displacement of the armature in the closed gap position. Point 140 shows the rebound of the armature after closure. On curve 132 the time at which the six contacts open can be seen by the six pips 144 to the right; and point 142 indicates the point at which the armature is completely open. The wave at the right of curve 132 indicates a vibratory oscillation after the contact system of the crossbar switch has returned to the unoperated position. The amplitude of this wave is indicative of the degree of friction in the system.

Figure 4:
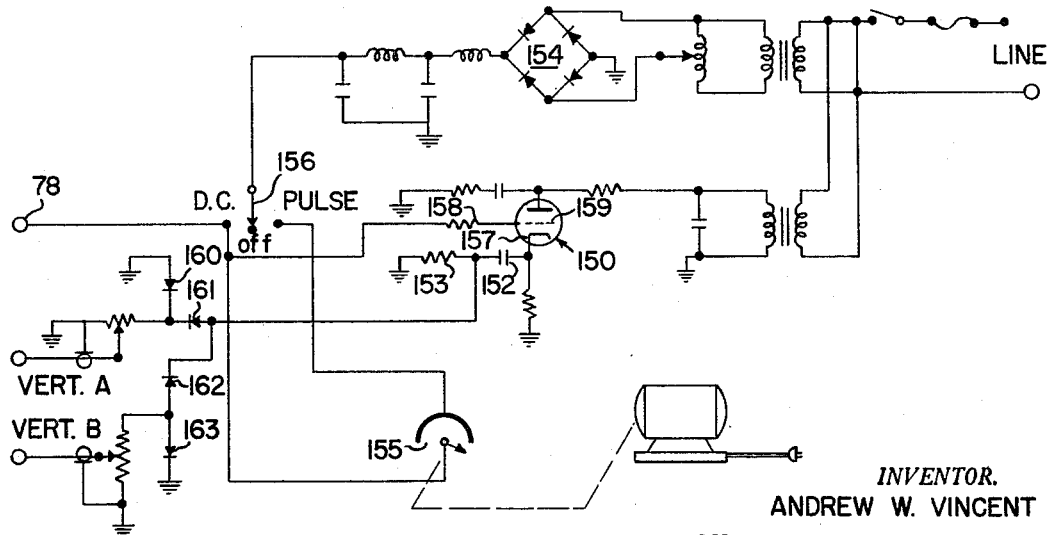
FIG. 4 is a schematic circuit diagram of an actuator circuit for alternately energizing and deenergizing the actuator of a switch being tested in the circuit shown in FIG. 2.

As hereinabove stated, relatively strong voltage surges are produced by the coils 12 and 74 upon denergization of the bridge 70, and even with the voltage limiting diodes 77, it has been found desirable to provide further limiting in order to prevent excessive blocking, or swamping of the sweep trigger circuit of the oscilloscope by the voltage surges. Such further limiting is provided in the energizing circuit illustrated in FIG. 4, wherein the sweep trigger signal is developed by a cathode follower 150, which drives a differentiating circuit including a capacitor 152 and a resistor 153.

The bridge energizing current is supplied from a full wave rectifier 154 through a selector switch 156, which may be positioned for constantly energizing the bridge 70, or for pulse energization, that is, alternate on-off. When the switch is to the right, as viewed in FIG. 4, and connected for pulse operation, the output of the rectifier 154 is alternately connected and disconnected to and from the bridge 70 by any desired commutating switch arrangement such as the motor driven rotary commutator 155 illustrated. The input voltage to the bridge 70, which appears between the terminal 78 and ground, and which also includes the surge component due to the inductance of the coils 12 and 74 is also applied to the control grid 159 of the cathode follower through a relatively high value series grid resistor 158. When the surge voltage becomes excessive, current flows from the grid 159 to the cathode 157, thereby dividing the excess voltage between the limiting resistor 158 and the grid-to-cathode circuit, and thus limiting the degree to which the surge voltage appears at the output of the cathode follower. The output of the differentiating circuit driven by the cathode follower is connected through appropriately oriented diodes 160, 161, 162, and 163 to the vertical input terminals of the oscilloscope for triggering the sweep circuits therein if the oscilloscope is set for internal synchronization. Alternatively, the cathode follower output may be connected to separate synchronization input terminals if the oscilloscope is so equipped.

The values of the various different elements of an actual circuit according to the diagram shown in FIG. 2, which has been built and successfully operated are as follows:

Output of the full wave rectifier 90 _____ 24 volts.
Output of the half wave rectifier 110 ___ 85 volts.
The charging resistors 50', and the discharging resistors 62' _____ 4.7 megohms.
The differentiating resistors 56' and 68' __ 10,000 ohms.
The discriminating resistors 100, 101, 102, and 103 _____ 5,100 ohms.
The output resistor 58 _____ 470 ohms.
The current limiting resistors 49' _____ 10,000 ohms.
The neon lamp limiting resistors 108 ____ 33,000 ohms.
The differentiating capacitor 60' and 46–1 to 46–6 _____ .001 μfd.
The grid limiting resistor 158 (FIG. 4) __ 1 megohm.

The values of the balancing resistors 16, 16', 18, and 18' are chosen approximately to match the resistances of the respective actuators 12, 12', and 74 in the bridge 70.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. Method of testing an electrical relay of the type having an energizable coil and an armature movable in response to energization of the coil to ascertain its operating characteristics, said method comprising simultaneously applying an energizing voltage of predetermined magnitude to the coil of a relay to be tested, and a voltage of the same magnitude to the coil of another relay similar to the relay being tested, and comparing the growths of the current flow through the respective coils produced in response to the applied voltages.

2. Method of testing an electrical relay of the type having an energizable coil and an armature movable in response to energization of the coil to ascertain its operating characteristics, said method comprising simultaneously applying an energizing voltage of predetermined magnitude to the coil of a relay to be tested, and a voltage of the same magnitude to the coil of another relay similar to the relay being tested, holding the armature of said other relay fixed while said voltage is applied, and producing an electrical signal indicative of the difference between the growths of the currents in the respective coils produced in response to the applied voltages immediately following application thereof.

3. Method of testing an electrical relay of the type having an energizable coil and an armature movable in response to energization of the coil to ascertain its operating characteristics, said method comprising simultaneously applying an energizing voltage of predetermined magnitude to the coil of a relay to be tested, and a voltage of the same magnitude to the coil of another relay similar to the relay being tested, holding the armature of said other relay fixed while applying said voltage, producing an electrical signal indicative of the difference between the growths of the currents produced in the respective coils by the applied voltages, and applying the produced signal to the input terminals of an oscilloscope, thereby to produce a pictorial representation of the signal on the face of the oscilloscope.

4. Method of testing an electrical relay of the type having an energizable coil and an armature movable in response to energization of the coil to ascertain its operating characteristics, said method comprising simultaneously applying an energizing voltage of predetermined magnitude to the coil of a relay to be tested, and a voltage of the same magnitude to the coil of another relay similar to the relay being tested, holding the armature of said other relay fixed while applying said voltage, producing a signal indicative of the difference between the growths of the currents produced in the respective coils, applying the signal so produced to the input terminals of an oscilloscope to produce a pictorial representation of the signal on the face of the oscilloscope, generating a relatively short electrical pulse in response to the change in the contact position of the relay under test responsive to the application of the energizing voltage, and applying the pulse so generated to input terminals of the oscilloscope to produce a visual indication of the relative time of the change in contact position superimposed on the pictorial representation.

5. Method of testing an electrical relay of the type having an energizable coil and an armature movable in response to energization of the coil to ascertain its operating characteristics, said method comprising simultaneously applying an energizing voltage of predetermined magnitude to the coil of a relay to be tested, and a voltage of the same magnitude to the coil of another relay similar to the relay being tested, holding the armature of said other relay fixed while applying the energizing voltage, producing a signal indicative of the difference between the instantaneous transient currents flowing in the respective coils immediately following application of the voltages, applying the signal so produced to the vertical input terminals of an oscilloscope to produce a pictorial representation of the signal on the face of the oscilloscope, generating a relatively short electrical pulse in response to the change in contact position of the relay under test responsive to application of the voltage, and applying the pulse so generated to the horizontal input terminals of the oscilloscope to produce a visual indication of the relative time of the change in contact position superimposed on the pictorial representation in the form of a pip extending laterally from the oscilloscope trace.

6. Apparatus for testing an electrical relay of the type having an energizable coil, an armature movable in response to energization of the coil, and plural contacts actuatable by the armature, said apparatus comprising a bridge circuit, a reference relay similar to the relay to be tested in one arm of said bridge circuit, means for holding the armature of said reference relay open despite energization of said reference relay means for connecting the coil of the relay to be tested in an adjacent arm of said bridge circuit, means for applying a voltage across said bridge circuit in one coordinate direction, means for applying the resulting transient voltage produced across said bridge circuit in the other coordinate direction thereof immediately following application of voltage thereto to an indicating device to produce an indication of the differences between the growths of the currents produced in the respective coils by the applied voltage, plural differentiating circuits for producing electrical pulses of relatively short duration, means for separately connecting said differentiating circuits to respective ones of the contacts of the relay to be tested so that said differentiating circuit produce electrical pulses in response to changes in the contact positions of the contacts, and means for selectively disabling selected ones of said differentiating circuits.

References Cited by the Examiner

UNITED STATES PATENTS

| | | | |
|---|---|---|---|
| 2,840,780 | 6/1958 | Weeks | 324—28 |
| 2,863,609 | 12/1958 | Link | 242—4 |
| 3,045,177 | 7/1962 | Weed | 324—54 |

WALTER L. CARLSON, *Primary Examiner.*

W. C. COOPER, FREDERICK M. STRADER,
*Examiners.*

R. M. GOLDMAN, G. L. LETT, *Assistant Examiners.*